United States Patent [19]

Tash

[11] 4,005,893
[45] Feb. 1, 1977

[54] ARTICLE GRIPPING TONGS

[76] Inventor: George Tash, 15155 Stagg St., Van Nuys, Calif. 91405

[22] Filed: Dec. 10, 1975

[21] Appl. No.: 639,292

[52] U.S. Cl. .................................. 294/28; 294/118; 294/16

[51] Int. Cl.² .................................. A47J 29/06

[58] Field of Search .................. 294/11, 13, 28, 29, 294/30, 16, 50.7, 118; 81/415, 416, 417, 418, 419, 424, 347, 346; 128/321, 322, 323, 324

[56] References Cited

UNITED STATES PATENTS

| 2,404,224 | 7/1946 | Fink | 294/28 |
|---|---|---|---|
| 2,531,304 | 11/1950 | Seewald | 294/118 |
| 2,559,978 | 7/1951 | Marco | 294/28 |
| 3,116,084 | 12/1963 | Docken | 294/28 |
| 3,628,818 | 6/1969 | Pittman | 294/28 |

Primary Examiner—James B. Marbert
Attorney, Agent, or Firm—John J. Posta, Jr.

[57] ABSTRACT

The improved tongs of the invention are adapted to separate, releasably grip and retrieve articles such as packages and the like from relatively unaccessible places. The tongs include a pair of elongated pivotably interconnected pincer members with handles and with specifically configured, depending article-gripping arms. The arms converge towards their free opposed ends which terminate in wedge-shaped, projecting package-separating portions. The arms include intermediate diverging portions to accommodate various sizes and shapes of packages and the adjacent surfaces of the arms have grip-increasing means, such as roughened areas. Preferably, a separate flexible sleeve is releasably disposed over each arm and bears the roughened area and also the wedge-shaped projecting package-separating portion. Special alignment-retaining means may be provided at the pincer pivot point.

10 Claims, 7 Drawing Figures

U.S. Patent  Feb. 1, 1977  4,005,893
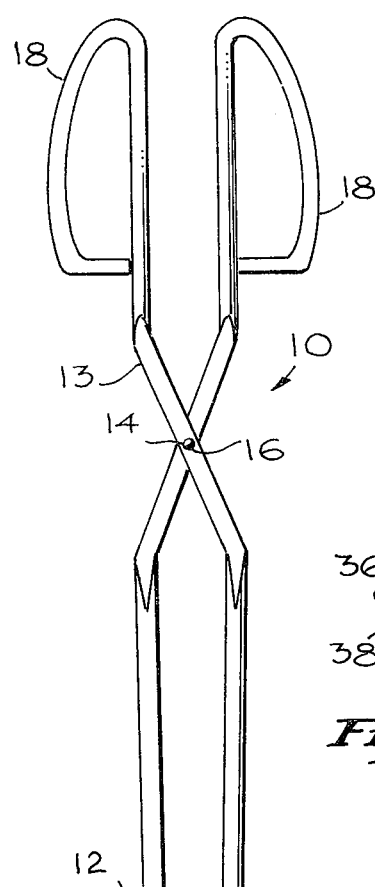
Fig. 1
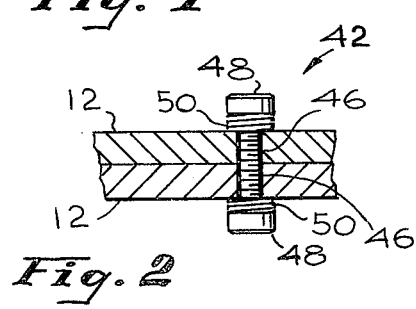
Fig. 2
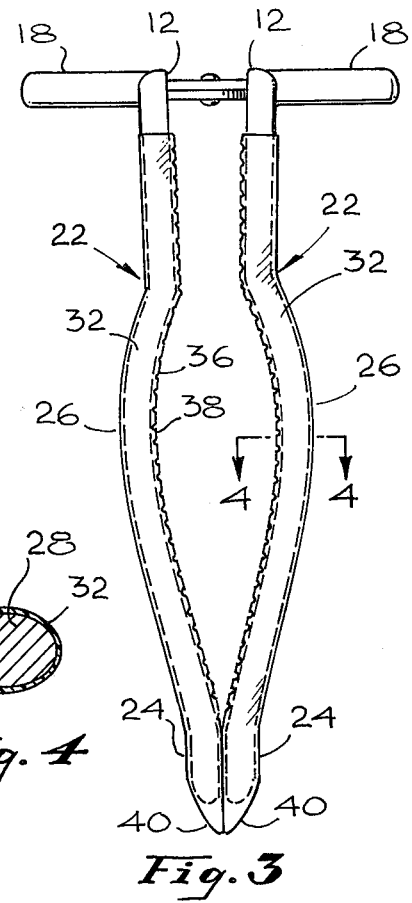
Fig. 3
Fig. 4
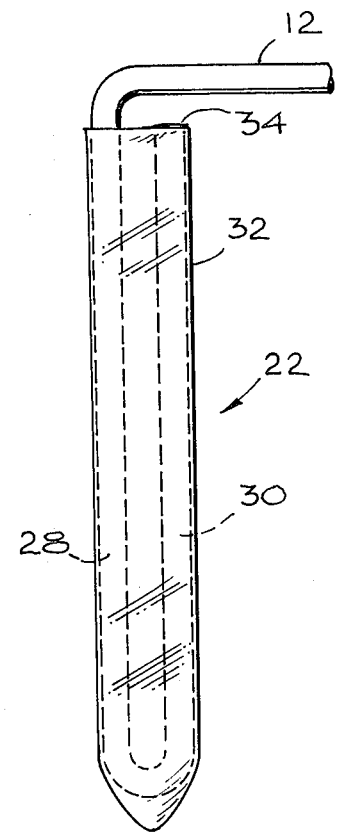
Fig. 5
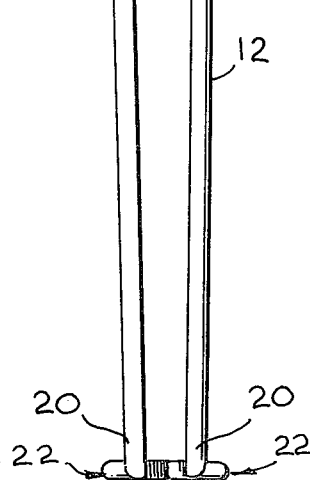
Fig. 6
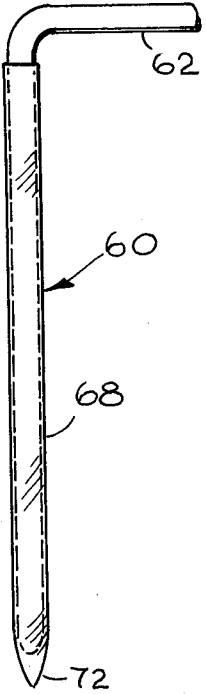
Fig. 7

ARTICLE GRIPPING TONGS

BACKGROUND OF THE INVENTION

1. Field of the Invention

The present invention generally relates to handling means and more particularly to article-gripping tongs for home and shop use and the like.

2. Prior Art

Various types of specifically configured tongs have been devised for a special limited purpose such as the handling of eggs (U.S. Pat. No. 3,628,818) and the gripping and handling of Mason-type jars (U.S. Pat. No. 3,159,554) and the like. However, the great bulk of tongs presently being sold are of general purpose usage, employ relatively simple, flat opposed surfaces and are not very well adapted for reaching, gripping and moving bulky or odd-shaped articles such as packages commonly encountered; for example, in general purpose stores and such specialty stores as grocery stores, hardware stores and the like.

There still is a need for simple efficient tongs which can be easily used to separate closely stacked packages from one another and to firmly grip and pull them from relatively difficult to reach storage positions on shelves, racks and the like. Such tongs should be light in weight and be capable of being used effectively with a wide variety of weights, sizes and shapes of packages and other articles.

SUMMARY OF THE INVENTION

The foregoing needs have now been satisfied by the improved tongs of the present invention. The improved tongs are substantially as set forth in the Abstract above. Thus, they include a pair of elongated pincer members pivotably interconnected adjacent one end to increase their leverage and bearing gripping arms at their appropriate ends. The arms depend about perpendicular to the pincer members and converge to opposed free ends having wedge-shaped package-separating projections, but diverge at intermediate portions to accommodate various sizes and shapes of packages.

Grip increasing means in the form of flexible sleeves bearing roughened areas can be disposed on adjacent surfaces of the two arms. The sleeves also preferably bear the wedge-shaped projections, although the arms themselves can be configured to provide the projections and/or grip-increasing means. The pivot point of the pincers is preferably fitted with an alignment-retaining means in the form of one or more pins, springs and the like biasing the pincers together. Further features of the invention are set forth in the following detailed description and accompanying drawings.

BRIEF DESCRIPTION OF THE DRAWINGS

FIG. 1 is a schematic top plan view of a preferred embodiment of the improved tongs of the invention.

FIG. 2 is a schematic enlarged fragmentary cross-section illustrating improved pincer member-alignment retaining means.

FIG. 3 is a schematic front elevation of the package-gripping arms of the tongs of FIG. 1.

FIG. 4 is an enlarged schematic cross-section of one bar of a pincer arm taken along the section line 4 — 4 of FIG. 3.

FIG. 5 is a schematic side elevation of the arms of FIG. 3.

FIG. 6 is a schematic front elevation of a second preferred embodiment of the pincer arms of the improved tongs of the present invention.

FIG. 7 is a schematic side elevation of the arms of FIG. 6.

DETAILED DESCRIPTION

FIGS. 1, 3, 4, and 5

Now referring more particularly to FIG. 1, improved tongs 10 are schematically depicted therein and include a pair of elongated, rod-like pincer members 12 which intersect and are flattened and interconnected adjacent their rear end 13 at a pivot point 14 by pivot means such as a rivet 16 or the like. End 13 also bears a pair of spaced open loop handles 18.

Front end 20 of each member 12 has an article-gripping rod-like arm 22 (FIG. 3) depending therefrom, preferably at an angle about perpendicular to members 12. When handles 18 are moved to their closest approximation, arms 22 generally converge to their opposed abutting free ends 24 but diverge therebetween as at points generally designated 26, so as to be capable of readily gripping articles of various sizes and shapes.

As shown more particularly in FIG. 5, each arm 22 includes spaced front bar 28 and rear bar 30, with matching configurations. (FIG. 3)

The upper limit of each rear bar 30 preferably terminates below the level of pincer members 12 so that when a preferably flexible sleeve 32 of, for example, rubber, flexible plastic, or the like, is slipped over end 24 and both bars 28 and 30, it can overlap the upper end 34 of bar 30. This overlap tends to retain sleeve 32 in place or arm 22.

Each sleeve 32 includes a roughened area 36 on the surface 38 of its arm 22 which is adjacent to and facing the other arm 22, as shown in FIG. 3. This provides grip-increasing means on the gripping surfaces 38 of arms 22, so that even heavy articles can be picked up by tongs 10 and will not slip therefrom.

Moreover, each sleeve 32 has a wedge-shaped package moving projection 40, preferably of at least partially hardened rubber, plastic or the like. The two projections 40 can abut each other to form a triangular wedge (in front elevation in FIG. 3), which can be used to force closely aligned articles such as packages apart to enable the tongs 10 then to securely grip and move a given article.

It will be understood that projection 40 could be built into or be integral with ends 24 of arms 22 and/or that surfaces 38 themselves could be roughened so as to partly or completely dispense with sleeves 32. However, sleeves 12 are desirable for the most economical construction of tongs 10. Preferably, bars 28 and 30 are flat on surfaces 38 to facilitate article-gripping (see FIG. 4).

FIG. 2

It is desirable to assure that ends 24 stay in proper alignment for maximum gripping efficiency. Rivet 16 may tend to loosen up after long use of tongs 10, thus tending to cause misalignment of ends 24. To prevent this, an alignment-retaining system 42 can be used as is schematically illustrated in FIG. 2. Such system 42 may include a threaded pin 44 disposed in aligned holes 46 in pincers 12 and capped with threaded lock nuts 48 bearing against springs 20. It will be understood that, if desired, any equivalent self-alignment system can be used in place of system 42.

Tongs 10 are used by first gripping handles 18 so that arms 22 project away from the user, if desired, then using projections 40 to nudge a package into gripping position, then moving handles 18 away from each other, positioning arms 22 around the package (or other article), moving handles 18 toward each other to grip the package and moving it as desired. It is then released by appropriate movement of handles 18.

FIG. 6 and 7

A second preferred embodiment of the article-gripping portion of the improved tongs of the invention is shown schematically in FIG. 6 and FIG. 7 and can be used, if desired, in place of arms 22 and sleeves 32. Thus, a pair of arms 60 can depend from members 62 (identical to members 12) and converge (as arms 22) to releasably abutting free ends 64 which, unlike arms 22, are not reflected back up towards the pincer member. Instead, each arm 22 has only a single elongated bar or plate which is flattened and elongated parallel to member 62 and is covered by a thin flexible sleeve 68, which can be glued in place or otherwise affixed to plate 66.

Each sleeve 68 is roughened in an area 70 facing the opposing area 70, to increase the article-gripping ability of arms 60, and is provided with a wedge-shaped tip 72 over end 64, the two ends 64 forming a package-separating projection. It will be understood that, if desired, ends 64 can be configured similar to tips 72 to effect the same purpose, and that opposed surfaces 74 of plate 66 can be roughened to substitute for sleeve 68, if desired.

Accordingly, an improved package handling device is provided which can be conveniently, inexpensively and durably made by conventional materials such as metal, plastic and the like. Various modifications, alterations and additions can be made in the improved tongs and in the components thereof. All such modifications, alterations and additions as are within the scope of the appended claims form part of the present invention.

I claim:

1. Improved article-gripping tongs, said tongs comprising, in combination:
    a pair of elongated pincer members pivotably interconnected and each having handle means adjacent one end thereof and an article-gripping arm depending from the opposite end thereof,
    said arms consisting of a lower portion and an upper portion;
    said upper and lower portions of said arms being integral with one another;
    said lower portion of said arms and said handle means substantially lying in a first plane;
    said upper portion of each of said arms lying in a second plane which is at an angle to said first plane;
    one of said arms and its associated handle means lying in a third plane;
    the remaining arm and its associated handle means lying in a fourth plane;
    said third and fourth plane lying at an angle with respect to one another;
    whereby one end of the upper portions of said arms generally converge towards one another and the opposite end of the upper portions of said arms generally diverge away from one another, such that upon closing of said tongs, the said one ends initially contact one another while said opposite ends initially are simultaneously displaced from one another;
    said arms being made from a flexible, elastic material whereby said opposite ends can be moved closer to one another while said one ends are maintained in contact with one another; and,
    grip increasing means disposed on each of said upper arm portions.

2. The improved tongs of claim 1 wherein said tongs are adapted to separate, to grip and move packages.

3. The improved tongs of claim 2 wherein each said arm comprises a flattened plate generally perpendicular to the remainder of said pincer member.

4. The improved tongs of claim 1 wherein said pincer members have open loop handles and are pivotally interconnected by alignment-retaining means.

5. The improved tongs of claim 1 wherein said alignment-retaining means include pin means and spring means therearound biasing said pincer members toward each other.

6. The improved tongs of claim 1, wherein said upper portion of each of said arms comprise an elongated configured rod portion reflected back upon itself and terminating at a point intermediate the length of said upper portion of said arm.

7. The improved tongs of claim 6, said grip increasing means comprising a flexible sleeve member with gripping means disposed thereon adapted to envelope the upper portion of each arm inclusive of the rod portion reflected back upon itself,
    said sleeves having article separating means comprising complementary wedge-shaped projections substantially presenting a pointed end located at and covering the said one end of each of the upper portions of said arms.

8. The improved tongs of claim 7 wherein said grip increasing means includes a roughened flexible area and wherein said sleeves are resilient.

9. The improved tongs of claim 8 and wherein each said arm includes sleeve-retaining detent means.

10. The improved tongs of claim 9 wherein opposed surfaces of said rods are flat.